United States Patent
More et al.

(10) Patent No.: US 12,481,809 B2
(45) Date of Patent: Nov. 25, 2025

(54) ADAPTIVE USER INTERFACES FOR COMPUTER-AIDED TECHNOLOGY APPLICATIONS

(71) Applicant: Siemens Industry Software Inc., Plano, TX (US)

(72) Inventors: Shirish More, Rochester Hills, MI (US); Rajan Desai, Loveland, OH (US); William Lawrence, Cold Spring, KY (US); Alexander Sammons, Cincinnati, OH (US)

(73) Assignee: Siemens Industry Software Inc., Plano, TX (US)

( * ) Notice: Subject to any disclaimer, the term of this patent is extended or adjusted under 35 U.S.C. 154(b) by 1076 days.

(21) Appl. No.: 17/417,308

(22) PCT Filed: Jan. 16, 2019

(86) PCT No.: PCT/US2019/013774
§ 371 (c)(1),
(2) Date: Jun. 22, 2021

(87) PCT Pub. No.: WO2020/149839
PCT Pub. Date: Jul. 23, 2020

(65) Prior Publication Data
US 2022/0075917 A1 Mar. 10, 2022

(51) Int. Cl.
*G06F 30/27* (2020.01)
*G06F 8/51* (2018.01)
*G06F 30/12* (2020.01)

(52) U.S. Cl.
CPC ............... *G06F 30/27* (2020.01); *G06F 8/51* (2013.01); *G06F 30/12* (2020.01)

(58) Field of Classification Search
CPC .................... G06F 30/27; G06F 30/12
(Continued)

(56) References Cited

U.S. PATENT DOCUMENTS

| 6,418,424 B1 | 7/2002 | Hoffberg et al. |
| 6,850,252 B1 | 2/2005 | Hoffberg |

(Continued)

OTHER PUBLICATIONS

PCT International Search Report and Written Opinion of International Searching Authority mailed Oct. 9, 2019 corresponding to PCT International Application No. PCT/US2019/013774 filed Jan. 16, 2019.

(Continued)

*Primary Examiner* — William L Bashore (57) ABSTRACT

A system may support adaptive user interfaces (UIs) for computer-aided technology (CAx) applications. The system may include a CAx tracking engine configured to track command usage of a computer-aided technology (CAx) application to obtain command usage data for the CAx application and a CAx training engine configured to train a machine learning model with the command usage data. The system may also include a CAx adaptive UI engine configured to obtain real-time command usage by a user of the CAx application; and apply the machine learning model to adaptively transform a UI of the CAx application, including by inputting the real-time command usage of the CAx application to the machine learning model to determine a predicted command based on the real-time command usage and dynamically updating a selected sub-section of the UI of the CAx application to present the predicted command to the user.

17 Claims, 7 Drawing Sheets

(58) Field of Classification Search
USPC .......................................................... 715/745
See application file for complete search history.

(56) References Cited

U.S. PATENT DOCUMENTS

| | | | | |
|---|---|---|---|---|
| 7,069,192 | B1* | 6/2006 | Freitag | G06F 30/00 |
| | | | | 700/182 |
| 10,373,064 | B2* | 8/2019 | Mascaro | G06N 20/00 |
| 10,467,029 | B1* | 11/2019 | Lin | G06F 9/451 |
| 10,621,597 | B2* | 4/2020 | Mascaro | G06Q 10/10 |
| 10,621,677 | B2* | 4/2020 | Mascaro | G06Q 40/123 |
| 10,949,432 | B1* | 3/2021 | Grayson | G06F 16/9035 |
| 11,210,718 | B1* | 12/2021 | Engelbart | G06Q 30/0641 |
| 2002/0083082 | A1* | 6/2002 | Fujieda | G06F 30/00 |
| | | | | 707/999.203 |
| 2003/0233199 | A1* | 12/2003 | Raab | G01B 21/04 |
| | | | | 702/33 |
| 2007/0030286 | A1* | 2/2007 | Hirasaka | G06T 19/20 |
| | | | | 345/619 |
| 2009/0327991 | A1* | 12/2009 | Weatherhead | G06F 8/10 |
| | | | | 717/101 |
| 2013/0124557 | A1* | 5/2013 | Goode | G06F 16/2455 |
| | | | | 707/769 |
| 2013/0159228 | A1* | 6/2013 | Meijer | G06F 9/451 |
| | | | | 706/14 |
| 2017/0097750 | A1* | 4/2017 | DeLuca | G06F 40/274 |
| 2017/0109356 | A1* | 4/2017 | Sawal | G06F 9/453 |
| 2018/0365025 | A1 | 12/2018 | Almecija et al. | |
| 2021/0063999 | A1* | 3/2021 | Kim | G06N 20/00 |
| 2022/0035966 | A1* | 2/2022 | McMinn | G06F 30/20 |
| 2022/0138875 | A1* | 5/2022 | Beynel | G06Q 10/025 |
| | | | | 705/7.41 |

OTHER PUBLICATIONS

Anonymous: "Command pattern—Wikipedia", Dec. 4, 2018 (Dec. 4, 2018), pp. 1-15, XP093042412, Retrieved from the Internet: URL: https://en.wikipedia.org/W/index.php?title=Command_pattern &oldid=871976553 [retrieved on Apr. 26, 2023].

* cited by examiner

Figure 7 ent dynamically updating a selected sub-section of the UI of the CAx application to present the predicted command to the user.

ADAPTIVE USER INTERFACES FOR COMPUTER-AIDED TECHNOLOGY APPLICATIONS

BACKGROUND

Computer systems can be used to create, use, and manage data for products and other items. Computer-aided technology (CAx) systems, for instance, may include any computing system used to aid in the design, analysis, and manufacture of products. Examples of CAx systems include computer-aided design (CAD) systems, computer-aided engineering (CAE) systems, visualization and manufacturing systems, product data management (PDM) systems, product lifecycle management (PLM) systems, and more. These CAx systems may include components (e.g., CAx applications) that facilitate design and simulated testing of product structures and product manufacturing.

SUMMARY

Disclosed implementations include systems, methods, and logic that support adaptive user interfaces (UIs) for CAx applications.

In one example, a method may be performed, executed, or otherwise carried out by a computing system. The method may include tracking command usage of a CAx application to obtain command usage data for the CAx application; training a machine learning model with the command usage data; obtaining real-time command usage by a user of the CAx application; applying the machine learning model to adaptively transform a UI of the CAx application, including by inputting the real-time command usage of the CAx application to the machine learning model to determine a predicted command based on the real-time command usage; and dynamically updating a selected sub-section of the UI of the CAx application to present the predicted command to the user.

In another example, a system may include a CAx tracking engine, a CAx training engine, and a CAx adaptive UI engine. The CAx tracking engine may be configured to track command usage of a CAx application to obtain command usage data for the CAx application and the CAx training engine may be configured to train a machine learning model with the command usage data. The CAx adaptive UI engine may be configured to obtain real-time command usage by a user of the CAx application and apply the machine learning model to adaptively transform a UI of the CAx application. Adaptive transformation of the UI may include inputting the real-time command usage of the CAx application to the machine learning model to determine a predicted command based on the real-time command usage and dynamically updating a selected sub-section of the UI of the CAx application to present the predicted command to the user.

In yet another example, a non-transitory machine-readable medium may store instructions executable by a processor. Upon execution, the instructions may cause the processor or a computing system to track command usage of a CAx application to obtain command usage data for the CAx application; train a machine learning model with the command usage data; obtain real-time command usage by a user of the CAx application; apply the machine learning model to adaptively transform a UI of the CAx application, including by inputting the real-time command usage of the CAx application to the machine learning model to determine a predicted command based on the real-time command usage;

BRIEF DESCRIPTION OF THE DRAWINGS

Certain examples are described in the following detailed description and in reference to the drawings.

DETAILED DESCRIPTION

Computer-aided technology systems are used across nearly every facet of society to aid in the design, analysis, and manufacture of products. CAx applications are used for design and analysis across a wide array of products, from microscopic biomedical devices, to massive gas turbine blades, to everyday shoe wear, to integrated circuits, to automobile parts, and near countless other product types. To support such diversity in product types, CAx systems are continually increasing in capability and complexity. Modern CAx systems may include thousands to tens-of-thousands of unique commands, many of which are specific to particular industries, product structures, manufacturing processes, or other product-specific parameters.

The complexity of CAx applications can often result in inefficiencies both from a user-standpoint and from a resource-performance standpoint. CAx application user interfaces are traditionally static, requiring specific user configurations to personalize the CAx UI with relevant commands used by a particular user or organization. Moreover, with such an immense library of commands, many users lack the training or knowledge to efficiently identify relevant commands for design and analysis of particular product types. CAx application documentations may describe "best practices" for certain product structures or product domains, but are often times tedious to read, overly complex, and are static in nature. Some solutions like "recently used" command lists, while at times helpful, are incapable of understanding the present context of CAx application use and many times irrelevant to the particular product design or product file that a user is designing.

From a performance standpoint, the complexity of CAx applications may result in inefficient usage of computing resources. As users delve through an immense library of commands for different product designs and analysis, extra computing cycles, power supply, and memory resources are consumed without any actual progress towards product design. Moreover, many CAx commands perform overlapping functions, and inefficient command usage may result in unproductive processor cycles and inefficient memory consumption as compared to other CAx command sequences (e.g., enhanced CAx features released in newer CAx application versions). In some instances, older CAx commands are replaced with updated CAx commands, and such command replacements may result in user error and lost/ineffective user-time due to confusion and misuse. Accordingly, the increasing complexity of CAx applications may result in inefficiencies from both a user standpoint and a computing performance standpoint.

The disclosure herein may provide systems, methods, devices, and logic for adaptive UIs for CAx applications. In particular, the CAx adaptive UI features described herein may dynamically transform selected sub-portions of CAx application UIs to present selected CAx commands predicted to be relevant to a particular context in which a user is using the CAx application. In some implementations, machine learning models are trained using command usage data to allow for UI adaptations on a per-user or per-product basis. Such UI adaptions may take into account the differences in knowledge, style, and preferences of different users, doing so in the context of a product development cycle workflow. As such, the CAx adaptive UI features described herein may be user-centric and intelligently adapt CAx UIs to increase usability, productivity, and the computing performance of CAx computing systems.

These and other benefits and CAx adaptive UI features are described in greater detail herein.

Figure 1:
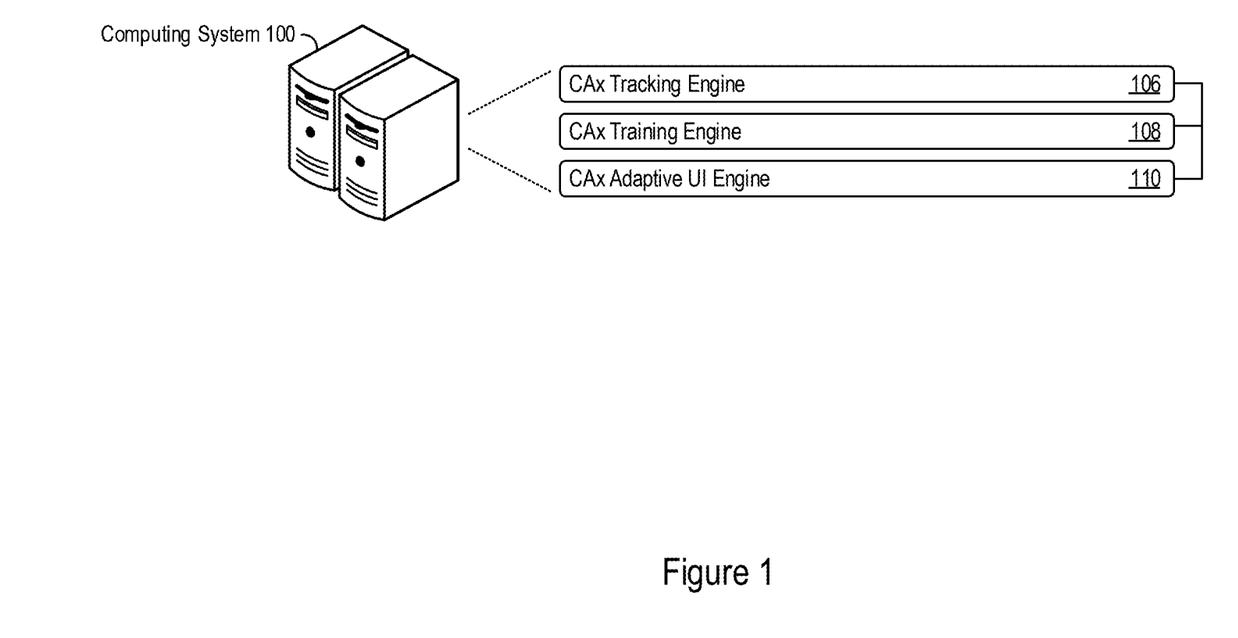
FIG. 1 shows an example of a computing system that supports adaptive UIs for CAx applications.

FIG. 1 shows an example of a computing system 100 that supports adaptive UIs for CAx applications. The computing system 100 may include a single or multiple computing devices such as application servers, compute nodes, desktop or laptop computers, smart phones or other mobile devices, tablet devices, embedded controllers, and more. In some implementations, the computing system 100 implements a CAx tool, application, or program to aid users in the design, analysis, and manufacture of products.

As described in greater detail herein, the computing system 100 may support adaptive UIs for CAx applications. By tracking command usage data of different users (both historically and in real-time), the computing system 100 may dynamically predict specific commands that a particular user will use at a present state of product design or analysis. The predicted commands may be specific to particular users, specific to CAx product domains (e.g., product types), or specific to specific points in a product design or analysis workflow. In some implementations, the computing system 100 may utilize machine learning and trained models to determined predicted commands, adapting a CAx UI in real-time based on tracked user commands to present predicted command sets relevant to the context in which the user uses the CAx application.

As an example implementation, the computing system 100 shown in FIG. 1 includes a CAx tracking engine 106, CAx training engine 108, and CAx adaptive UI engine 110. The system 100 may implement the engines 106, 108, and 110 (and components thereof) in various ways, for example as hardware and programming. The programming for the engines 106, 108, and 110 may take the form of processor-executable instructions stored on a non-transitory machine-readable storage medium and the hardware for the engines 106, 108, and 110 may include a processor to execute those instructions. A processor may take the form of single or multi-processor systems, and in some examples, the system 100 implements multiple engines using the same computing system features or hardware components (e.g., a common processor or a common storage medium).

In operation, the CAx tracking engine 106 may track command usage of a CAx application to obtain command usage data for the CAx application and the CAx training engine 108 may train a machine learning model with the command usage data. In operation, the CAx adaptive UI engine 110 obtain real-time command usage by a user of the CAx application and apply the machine learning model to adaptively transform a UI of the CAx application. Adaptive transformation of the UI by the CAx adaptive UI engine 110 may include inputting the real-time command usage of the CAx application to the machine learning model to determine a predicted command based on the real-time command usage and dynamically updating a selected sub-section of the UI of the CAx application to present the predicted command to the user.

These and other example CAx adaptive UI features according to the present disclosure are described in greater detail next.

Figure 2:
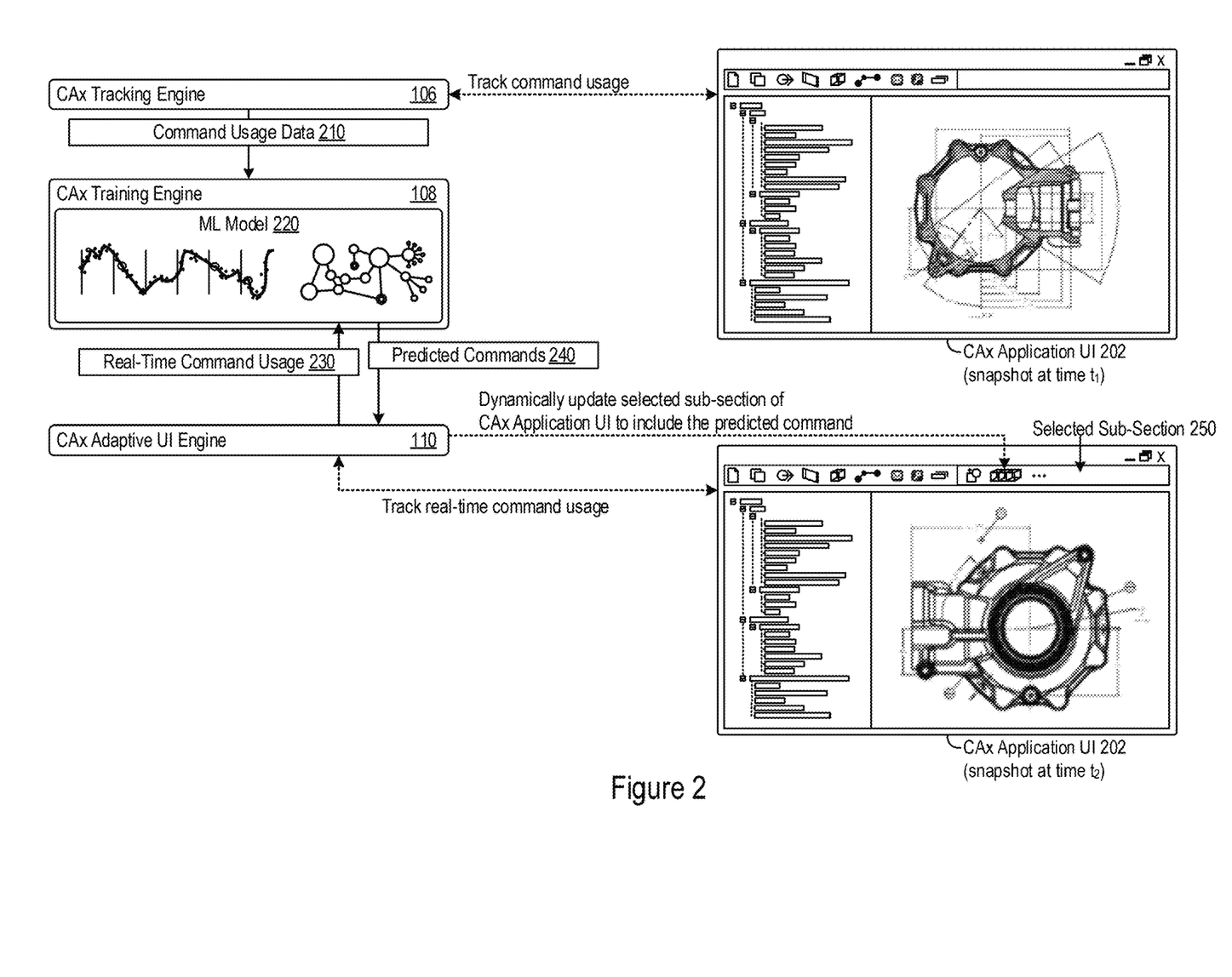
FIG. 2 shows an example of adaptations to a CAx application UI based on tracked command usage of a user.

FIG. 2 shows an example of adaptations to a CAx application UI based on tracked command usage of a user. To aid in describing various CAx adaptive UI features, FIG. 2 and other figures show an example CAx application UI 202 at different points in time.

To support CAx UI adaptations, the CAx tracking engine 106 may track command usage of a CAx application. Command usage may refer to any action by a user related to CAx application commands (also referred to herein as CAx commands). A CAx command may include any express operation or function that the CAx application implements. As such, the CAx tracking engine 106 may monitor user actions in the CAx application (e.g., mouse clicks or keyboard strikes) to track command usage. Such tracked command usage may include actions with regard to opening CAx files (e.g., an existing file of a specific CAx product type, opening a product template, creating a new product, etc.), which specific CAx commands are performed (e.g., specific product design operations, parameter or configuration setting, etc.), specific UI locations in clicked by a user (e.g., a CAD model face, edge, vertex, command ribbon, etc.), and more. For instance, the CAx application UI 202 (snapshot at time $t_1$) shown in FIG. 2 depicts a user execution of a sketch command (e.g., setting a dimension value), which the CAx tracking engine 106 may track as command usage for the CAx application.

In some implementations, the CAx tracking engine 106 tracks command sequences in the CAx application. Given the complex nature of CAx applications, tracked sequences of CAx commands may provide insight into specific workflows, dependencies, and context for various uses of the CAx application. Specific CAx application commands may not be relevant at certain points in a product design or simulation workflow, and command sequences tracked by the CAx tracking engine 106 may provide insight into such workflow dependencies.

As an illustrative example, the CAx tracking engine 106 may track command sequences that comprise or adhere to workflow dependencies for product reference point/coordinate system setting, geometry sketching, body material fills, manufacturing analysis, fiber simulations, or various other product design or analysis workflows. By tracking command sequences (as opposed to individual commands solely), the CAx tracking engine 106 may monitor user and CAx application behavior with greater detail to more precisely predict or suggest CAx commands in dynamic UI adaptations.

The CAx tracking engine 106 may provide tracked command usage of the CAx application to the CAx training engine 108 as command usage data 210. In some examples, the CAx tracking engine 106 processes the raw data of the tracked command usage, e.g., by transforming, normalizing, cleaning, filtering, or encoding the collected command usage prior to provision to the CAx training engine 108. Such processing may be performed by the CAx tracking engine 106 according to any number of predetermined parameters specific to learning models that the command usage data 210 will be used to train. In that regard, the CAx tracking engine 106 may process tracked command usage for the CAx application into training data sets, e.g., according to specifically selected machine learning features.

The CAx training engine 108 may use the command usage data 210 to train machine learning (ML) models for CAx command prediction. In FIG. 2, the CAx training engine 108 trains or feeds the ML model 220 with the command usage data 210. The ML model 220 may implement or provide any number of machine learning techniques to analyze, interpret, and utilize the command usage data 210 for command prediction. For instance, the ML model 220 may implement any number of supervised, semi-supervised, unsupervised, or reinforced learning models to interpret the command usage data 210. The ML model 220 may include Markov chains, context trees, support vector machines, neural networks, Bayesian networks, or various other machine learning components. Any number of machine-learning techniques and capabilities are contemplated herein to analyze and process the command usage data 210. In the example shown in FIG. 2, the CAx training engine 108 itself implements the ML model 220 (e.g., using local resources or as part of the CAx training engine 108). In other examples, the CAx training engine 108 may remotely access or interface with an external ML model 220.

Through use of the ML model 220, the CAx training engine 108 may, in effect, interpret usage data of CAx commands and CAx command sequences to predict or suggest relevant CAx commands specific to a particular user, particular product, particular workflow (e.g., design, simulation, etc.), or combinations thereof. The CAx tracking engine 106 and CAx training engine 108 may together operate during a "training mode" to collect command usage data 210 to train the ML model 220 (e.g., prior to any CAx UI adaptations). During such a training mode, the CAx tracking engine 106 may collect and provide command usage data 210 for a single or multiple users, for example during a collection time period set by a system administrator or organization. Collected training data (e.g., tracked command usage data) may be used to train and fine-tune the ML model 220 for CAx command prediction.

After the ML model 220 has been trained during the "training mode", the CAx adaptive UI engine 110 may utilize the ML model 220 in an "execution mode". During the "execution mode", the ML model 220 may be used to determine predicted commands based on real-time command usage by a user of the CAx application. In some implementations, the CAx training engine 108 may train the ML model 220 in such a manner that the "training" and "execution" modes overlap. The ML model 220 may be continually trained in connection with command prediction. Put another way, command prediction by the ML model 220 and training of the ML model 220 with user command monitoring (including predicted commands) may occur concurrently, and without any prior training of the ML model 220.

CAx commands predicted by the ML model 220 may represent particular commands or command sets that a CAx application user can use at the specific use context of the CAx application (e.g., the specific point the user is at in a product development, design, or analysis workflow using the CAx application). In that regard, predicted commands may represent a "solution" generated by the ML model 220 to identify relevant CAx commands based on monitored user activity, both in the real-time and from the training sets used to train the ML model 220. In some implementations, predicted commands determined by the ML model 220 may include suggested commands for use by the CAx application user as well, some of which may not have been previously tracked by the CAx tracking engine 106 or provided as training data to the CAx training engine 108. Thus, instead of a user manually searching via static command libraries for particular CAx commands relevant to a present CAx application context, the CAx adaptive UI engine 110 may instead adapt the CAx application UI 202 to present any number of predicted commands.

To provide an illustration of dynamic UI adaptation through FIG. 2, the CAx adaptive UI engine 110 may track real-time command usage of a CAx application, such as in a consistent manner as the CAx tracking engine 106. Then, the CAx adaptive UI engine 110 may process tracked real-time command usage of the CAx application into data interpretable by the ML model 220 (e.g., in consistent format as the command usage data 210). In FIG. 2, the CAx adaptive UI engine 110 provides the real-time command usage 230 to the CAx training engine 108 and the ML model 220, from which the ML model 220 may determine a predicted command set (e.g., including the predicted commands 240) based on the monitored user actions.

In some implementations, the predicted commands 240 may include a suggested command that deviates from prior user behavior (e.g., as tracked through the command usage data 210 during a "training" mode). In particular, the CAx training engine 108 may provide specific learning parameters to the ML model 220 biased towards improved CAx application efficiency in predicted command determinations.

As an example, the CAx training engine 108 may store a command mapping between older UI commands and newer (e.g., enhanced) UI commands. Such enhanced commands may serve as substitutes to mapped older commands, e.g., as released in newer CAx application versions as command enhancements or to effectuate command process changes. An illustrative mapping may specify that the combination of older command$_A$ and older command$_B$ can be replaced with newer command$_C$. Thus, when real-time command usage 230 tracked and provided by the CAx adaptive UI engine 110 indicates the user is selecting a command sequence that, based on historical data for the user, includes command$_A$ and command$_B$, the CAx training engine 108 may instead provide command$_C$ as part of the predicted commands 240. As such, the predicted command 240 may take the form of an updated or enhanced command of the CAx application to replace an outdated command identified in the real-time command usage 230 by the user. Such command replaces may improve the efficiency and effectiveness of CAx application executions.

The CAx adaptive UI engine 110 may dynamically update a selected sub-section of the CAx application UI 202 to present the predicted commands 240 (e.g., as part of a predicted command set). The selected sub-section may be a marked location in the CAx application UI 202, such as a "predicted" or "suggested" commands ribbon or some other delineated UI space reserved for such dynamic adaptations. In the example shown in FIG. 2, the CAx adaptive UI engine 110 dynamically transforms the selected sub-section 250 of the CAx application UI 202 (at a time $t_2$) to the predicted commands 240 (e.g., including the command icon with three connected cubes). Based on continuously monitored real-time command usage of the CAx application, the CAx adaptive UI engine 110 may continually adapt and transform the selected sub-section 250 of the CAx application UI 202 to present sets of predicted command set relevant to a present CAx application context.

In some implementations, the CAx training engine 108 continually trains the ML model 220 during the "execution" mode based on tracked user feedback with respect to predicted commands presented in the selected sub-section 250. For instance, the CAx adaptive UI engine 110 may track user responses to presentation of the predicted commands 240 (e.g., whether the user actually uses one or more of the predicted commands 240 or selects a non-predicted command). In either case, the CAx adaptive UI engine 110 may track a real-time response to the dynamic UI adaptation to present the predicted commands 240, and such monitoring may be provided as additional real-time command usage 230 to the CAx training engine 108 to further reinforce the ML model 220 as well as determine a subsequent predicted command. Put another way, the CAx adaptive UI engine 110 and CAx training engine 108 may monitor real-time command usage in response to a predicted commands 240 to determine a next set of predicted commands. In such a manner, the CAx adaptive UI engine 110 (in connection with the ML model 220) may continually adapt the CAx application UI 202 according to user behavior and CAx application context (e.g., command usage).

By dynamically updating the CAx application UI 202, the CAx adaptive UI engine 110 may transform static UI representations into a dynamic interface (at least at the selected sub-section 250) via continuous monitoring, learning, and feedback. As such, the CAx tracking engine 106, CAx training engine 108, and CAx adaptive UI engine 110 may provide a dynamic and adaptive CAx application UI 202 that accounts for user knowledge, preferences, and skills. That is, the CAx adaptive UI features may provide user-specific adaptations to improve the experience, usability, and efficiency of CAx applications.

In the example shown in FIG. 2, the CAx tracking engine 106, CAx training engine 108, and CAx adaptive UI engine 110 may provide CAx UI adaptations on a user-specific basis. For instance, the command usage data 210 tracked and used to train the ML model 220 may be specific to a particular user of the CAx application. By doing so, the CAx adaptive UI engine 110 may obtain predicted commands determined and reinforced specifically for the particular user, and thus adapt the CAx application UI 202 specifically to user-preferences, experience, CAx application usage history, and feedback.

While single user UI adaptations are illustrated in FIG. 2, a CAx computing system may support user-specific CAx adaptations for multiple users. In some implementations, the CAx training engine 108 implements a different machine learning model for each distinct user for which command usage data 210 and/or real-time command usage 230 is provided. In some implementations, the ML model 220 itself may differentiate between different CAx application users by encoding received command usage data 210 and/or real-time command usage 230 based on the specific user it originated from (e.g., via user IDs or other delineators). As another form of delineation, the CAx tracking engine 106, CAx training engine 108, and CAx adaptive UI engine 110 may provide adaptive UI features based on a domain-specific basis, described next with regards to FIG. 3.

Figure 3:
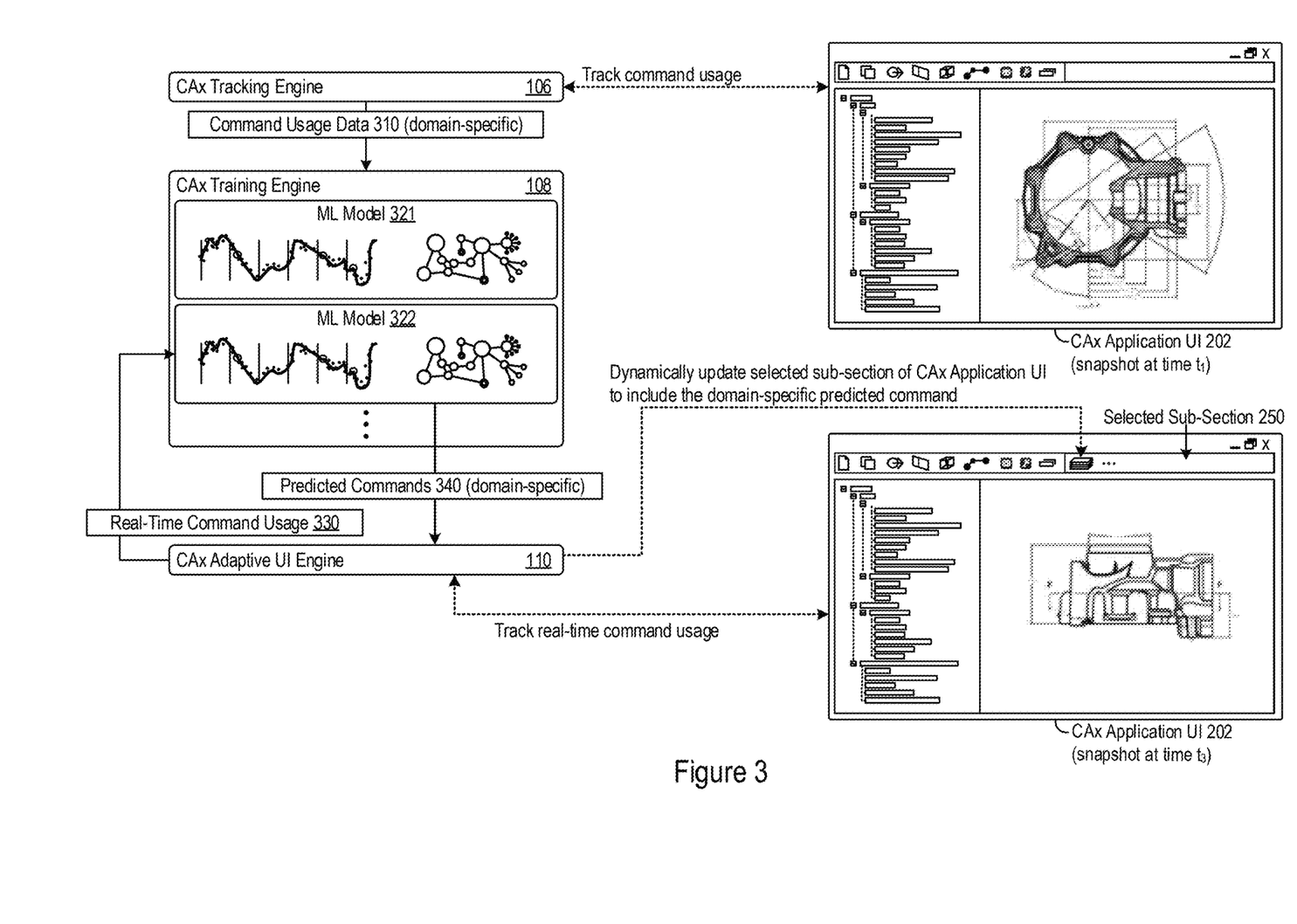
FIG. 3 shows an example of domain-specific adaptations to a CAx application UI based on tracked command usage.

FIG. 3 shows an example of domain-specific adaptations to a CAx application UI based on tracked command usage. A CAx domain may refer to any category or type by which a CAx application can differentiate products. Example CAx domains may include product differentiations according to different part templates, part manufacturing processes, industrial application, or other differentiations.

For CAx domains differentiated according to part templates, the CAx application may support creation of product files according to any number of preconfigured or user-customized product templates. The templates may correspond to specific types of products, and configure new products created with template files with specific parameters, configurations, constraints, or other part-specific characteristics. Example part templates include templates for CAD models, assemblies, sheet metal parts, routing (logical, mechanical, or electrical), etc. By differentiating according to template, CAx domain-specific UI adaptations may account for the specific part types that are being designed or analyzed by a CAx application user.

Additionally or alternatively, CAx domains (including part templates) may be categorized according to the manufacturing processes used to construct a product. As specific manufacturing processes may ascribe certain limits, characteristics, or requirements for products, CAx domains differentiated according to manufacturing processes may leverage or utilize distinguished sets of CAx commands. Example manufacturing processes which may serve as CAx domains include additive manufacturing (e.g., 3D printing and multi-axis deposition), integrated circuit fabrication, casting (e.g., metal casting), forming, moldings, machining, joining, packaging, mechanical and electrical routing, and more.

As yet another example of CAx domains, products may be differentiated according to industrial application. Examples of such CAx domains may specify the particular industry a product is associated with, such as aerospace, textile industries (e.g., shoe wear or clothing), high-performance computing, energy systems, and many more. While some examples of CAx domains are presented herein, any form of differentiation between products for CAx adaptive UIs is contemplated herein as a possible CAx domain.

The CAx tracking engine 106, CAx training engine 108, and CAx adaptive UI engine 110 may support UI adaptations on a CAx domain-specific basis. For instance, the CAx tracking engine 106 may track command usage of the CAx application on a CAx domain-specific basis. To do so, the CAx tracking engine 106 may classify tracked command usage to particular CAx domains applicable to tracked command usage.

CAx domain classification may be performed in multiple ways. In some implementations, the CAx tracking engine 106 classifies a CAx domain for tracked command usage based on a determined file template applicable to the tracked command usage, e.g., by identifying a "file→open template" command or by parsing metadata of a product file to determine the file template used to create the product file. As another example, the CAx tracking engine 106 may classify a CAx domain based on identified product metadata specified with respect to the command usage, such as a product file metadata for which the command usage is tracked. In yet another example, the CAx tracking engine 106 may analyze the product itself to determine an applicable CAx domain. For instance, the CAx tracking engine 106 may analyze product shape characteristics/features with respect to the command usage to identify a particular industry, template, or other categorization applicable to the product and tracked command usage.

As predicted commands may be provided on CAx-domain specific basis, the CAx tracking engine 106 may obtain tracked command usage from multiple different users for the same CAx domain. For instance, multiple users of a CAx application (e.g., within an organization) may use the CAx application to design and analyze products of a specific CAx domain (e.g., automobile engine components) and may do so from physically different locations. The CAx tracking engine 106 may obtain the tracked command usage for any number of the multiple users of this specific CAx domain to centrally process, e.g., by providing to the CAx training engine 108 to train CAx domain-specific machine learning models.

In FIG. 3, the CAx tracking engine 106 provides domain-specific command usage data 310 to the CAx training engine 108. In such examples, the CAx tracking engine 106 may encode or annotate the command usage data 310 with any particular CAx domain(s) applicable to the command usage data 310. Example annotations may include CAx domain codes (e.g., '01' for a additive manufacturing domain, '02' for a casting domain, etc.) or any other CAx domain indicator.

The CAx training engine 108 may support domain-specific machine learning for the command usage data 310. To do so, the CAx training engine 108 may implement machine-learning models that differentiate command prediction by CAx domain. In some instances, the CAx training engine 108 implements multiple different machine learning models, each of which may be associated with a specific CAx domain. FIG. 3 illustrates ML models 321 and 322 (and potentially more) that the CAx training engine 108 may implement for different CAx domains. The CAx training engine 108 may train the different machine learning models 321 and 322 for different CAx domains of the CAx application. For example, the CAx training engine 108 may provide different, CAx domain-specific training sets respectively to the ML models 321 and 322.

Figure 4:
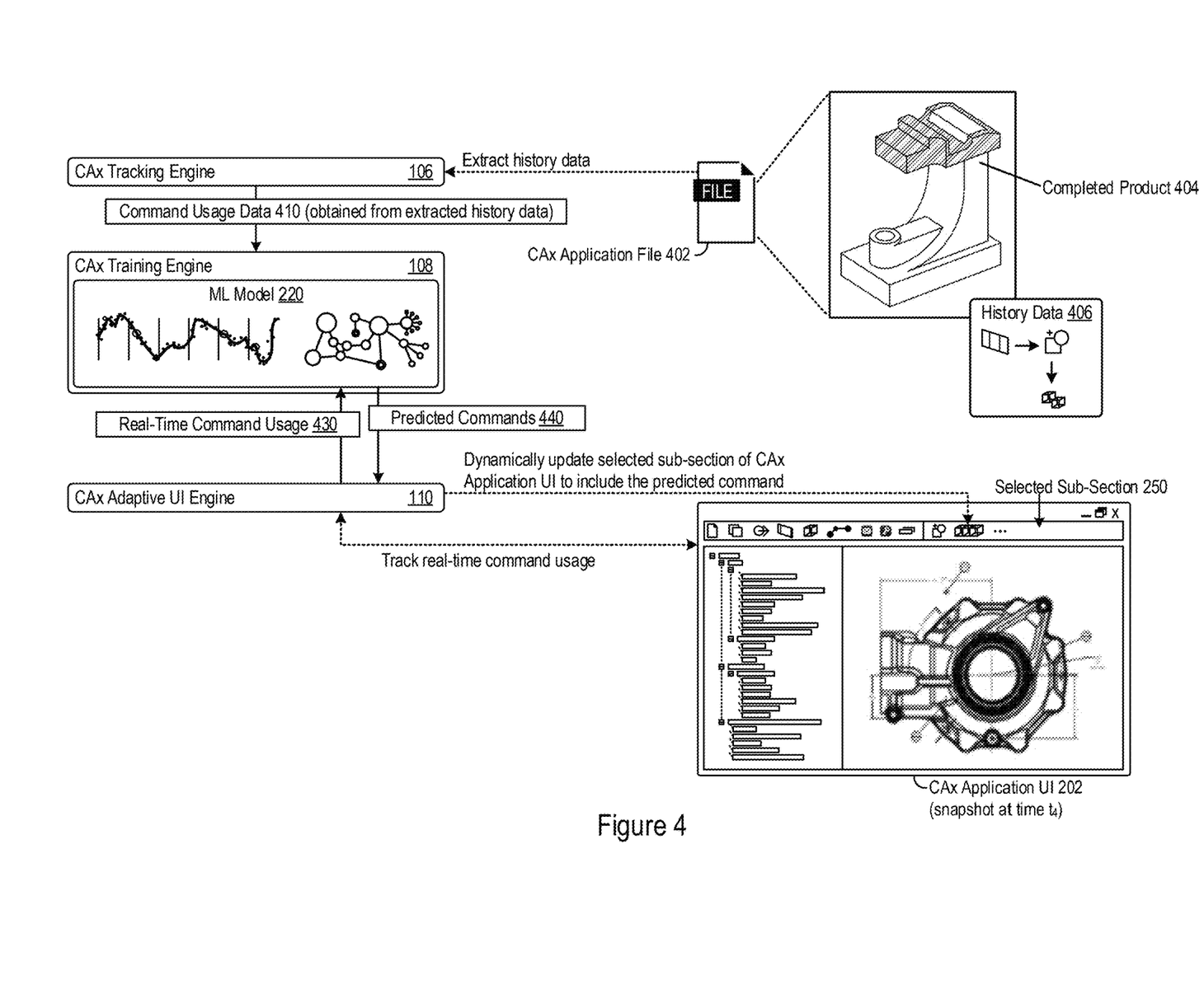
FIG. 4 shows an example of adaptations to a CAx application UI based on command usage data extracted from a product file.
Figure 5:
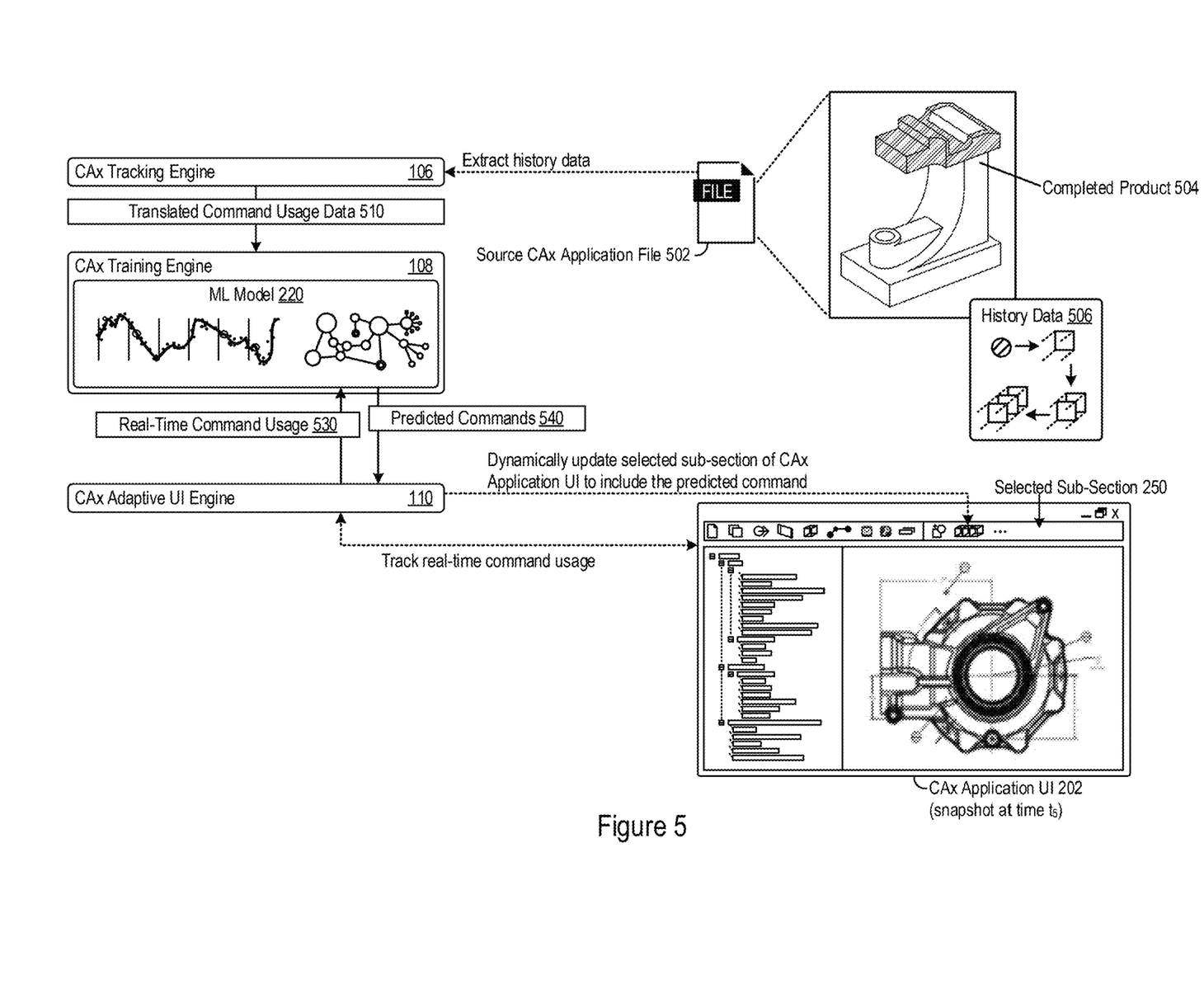
FIG. 5 shows an example of CAx application UI based on command usage data extracted from a product file of a different CAx application.

The ML models 321 and 322 may be part of a single machine learning model, such as the ML model 220 shown in FIG. 2 (and also in FIGS. 4 and 5). Such incorporation may be explicit (e.g., as distinctly separate models in a larger model) or via logical differentiation (e.g., by the ML model 220 treating/differentiating between command usage data and predicted commands by CAx domain).

The CAx adaptive UI engine 110 may adaptively transform the CAx application UI 202 on a domain-specific basis. FIG. 3 shows an example UI adaptation by the CAx adaptive UI engine 110 (at a time $t_3$) that is domain-specific. In doing so, the CAx adaptive UI engine 110 may track real-time command usage of the CAx application and provide real-time command usage 330 to the CAx training engine (and the ML models 321 and 322) that is domain-specific. In that regard, the CAx adaptive UI engine 110 may identify a particular CAx domain applicable to the tracked real-time command usage.

In some implementations, the CAx adaptive UI engine 110 may classify and encode the real-time command usage 330 on a per-CAx domain basis, for example in a consistent manner as the CAx tracking engine 106 with respect to the command usage data 310. Accordingly, the CAx training engine 108 may select and apply a specific machine learning model trained for particular CAx domain of the real-time command usage 330 (the ML model 322 in the example shown in FIG. 3). As also seen in FIG. 3, the CAx adaptive UI engine 110 obtains the predicted commands 340, which are CAx domain-specific to the real-time command usage 330, and adapts the selected sub-section 250 of the CAx application UI 202 accordingly.

By supporting CAx adaptive UIs on a domain-specific basis, the features described herein may increase the accuracy or relevance in which predicted commands and UI adaptations are provided. For instance, the CAx tracking engine 106 and CAx training engine 108 may utilize tracked command usage from multiple different users on a CAx domain-specific basis to train multiple machine learning models. In that regard, domain-specific CAx UI adaptations may leverage the collected knowledge, use, and expertise of different users for each particular CAx domain. Predicted commands adapted unto the CAx application UI 202 for a single (e.g., new) user in a particular CAx domain may encapsulate the expertise of multiple other (e.g., experienced) users for the CAx domain, which may improve the efficiency and usability of the CAx applications.

As described above, the CAx tracking engine 106, CAx training engine 108, and CAx adaptive UI engine 110 may support CAx UI adaptations based on tracked command usages, whether acquired during a "training" mode or in real-time during an "execution" mode. Additional or alternative sources of training data for machine learning models may also be leveraged, some of which are described next in FIGS. 4 and 5.

FIG. 4 shows an example of adaptations to a CAx application UI based on command usage data extracted from a product file. Training data for machine learning models may be acquired specifically for completed products that were previous designed or analyzed with the CAx application.

To illustrate through FIG. 4, the CAx tracking engine 106 may access the CAx application file 402. The CAx application file 402 may include product data for a completed product, which may refer to any product that was previously designed, analyzed, or manufactured. Completed products may thus include, as examples, commercially released product versions, prototype designs, discontinued products, etc.

The CAx application file 402 may include data for the completed product 404, such as a CAD model, geometry data, parameters, configurations, and the like. The CAx application file 402 may also include history data 406 for the completed product 404. The history data 406 may specify a log of commands (e.g., geometry operations, parameter setting, etc.) used to create, design, revise, or analyze the completed product 404. Such history data 406 may be "incomplete" in the sense that not every single command on the completed product 404 is tracked, but may include the command sequence that directly resulted in the version of the completed product 404 in the CAx application file 402.

The CAx tracking engine 106 may extract the history data 406 from the CAx application file 402 and parse the history data 406 to obtain command usage data for the completed product 404. In particular, the CAx tracking engine 106 may determine a command history (e.g., sequence of CAx commands) used for generation of the completed product 404. Such a command history may provide, at least in part, command usage data specific to the completed product 404. The CAx tracking engine 106 may process extracted command histories and provide the resulting command usage data 410 to the CAx training engine 108 as training data for the ML model 220. The command usage data 410 may be user-specific or CAx domain-specific, e.g., in a consistent manner as described herein.

By using the command usage data 410 as training data, the CAx training engine 108 may account for (e.g., "learn" from) command sequences indicative of the expertise, knowledge, and workflow requirements or best practices used to generate the completed product 404. In that regard, the ML model 220 may be more fully trained with additional training data based on use of the CAx application prior to a "training" mode. Doing so may increase the accuracy and relevance of predicted commands and CAx UI adaptations based on real-time use of the CAx application.

In FIG. 4, the CAx adaptive UI engine 110 dynamically updates the selection sub-section of the CAx application UI 202 at a time $t_4$. In doing so, the CAx adaptive UI engine 110 may track the real-time command usage for the CAx application, provide the real-time command usage 430 to the ML model 220, and obtain the predicted commands 440 for UI adaptation. In FIG. 4, the ML model 220 (and thus the predicted commands 440 generated by the ML model 220) accounts for the history data 406 and command history for the completed product 404. Predicted command sets from the ML model 220 may thus incorporate and account for the knowledge, expertise, preferences, and workflows of completed products.

FIG. 5 shows an example of CAx application UI based on command usage data extracted from a product file of a different CAx application. In the example of FIG. 5, the CAx tracking engine 106 may parse and extract product data for products of other, different CAx applications. Such a scenario may occur when an organization transitions to a different CAx application platform, e.g., from use of a prior (source) CAx application to a new (destination) CAx application.

The CAx tracking engine 106 may obtain an application file of a source CAx application that is different from the CAx application for which CAx adaptive UI features are implemented for. In FIG. 5, the CAx tracking engine 106 obtains (e.g., accesses) the source CAx application file 502, which may include product data for a completed product 504 and corresponding history data 506. The history data 506 may include command history for the completed product 504, but in commands specific to the source CAx application (and thus potentially different, incompatible, or irrelevant to the CAx application and the CAx application UI 202).

The CAx tracking engine 106 may extract history data 506 from the source CAx application file 502, and the history data 506 may include a source CAx command history for generation of the completed product 504 included in the source CAx application file 502. To address potential inconsistencies between the source CAx application and the (destination) CAx application, the CAx tracking engine 106 may translate source CAx command sequences in the history data 506 into a translated command usage data 510 for the CAx application.

In some implementations, the CAx tracking engine 106 does so by referencing a command mapping between the source CAx application and the (destination) CAx application. The command mapping may be predetermined based on command analyses between the different CAx applications, mapping specific commands from one CAx application to the other. The mappings may expand or condense command sequences based on specific implementation decisions for the different CAx applications. For instance, the source CAx application may include multiple commands to perform a particular action (e.g., create a surface mesh of a CAD model) that the destination CAx application may perform a single or lesser number of CAx commands, or vice versa. The translated command usage data 510 may reflect such differences in command implementation, and be in a form of CAx command sequences specific to the (destination) CAx application.

The CAx training engine 108 may train the ML model 220 using the translated command usage data 510, thus accounting for user knowledge, expertise, and preferences used to generate the completed product 504 using the source CAx application. Using such varied forms of training data for the ML model 220 may create a more robust, accurate, and effective model to determined predicted command sets, e.g., in a consistent manner as noted above. As such, the CAx adaptive UI engine 110 may track and provide real-time usage 530 of the CAx application, obtain the predicted commands 540 (that account for the history data 506 of the source CAx application file 502), and dynamically update the selected sub-section of the CAx application UI 202 (at a time $t_5$) to include the predicted commands 540.

In FIGS. 2-5, various examples of machine learning models are presented, including via the ML models 220, 321, and 322. The CAx training engine 108 may implement machine-learning model in support of the various CAx adaptive UI features described herein in multiple ways. In some implementations, the CAx training engine 108 implements multiple machine-learning models and uses a composite result of the multiple ML models to determine a predicted command. Different ML models may be weighted according to various factors to determine a composite predicted command, such as time-based, user-based, or CAx domain-based weights. As such, the multiple ML models may be trained based on any of the differentiations described herein.

As an example differentiation, the CAx training engine 108 may train multiple ML models based on timeframe, and gradually de-emphasize older ML models. To illustrate, the CAx training engine 108 may determine to train a new ML model after a timing criteria is satisfied, e.g., threshold amount of time has elapsed or training a current ML model with a threshold number of commands (e.g., after 1,000+ CAx commands have been learned by the ML model, whether in a "training" or "execution" mode). In some instances, the CAx training engine 108 may merge different ML models, such as the 'X' number of trained ML models (e.g., per a specific user or specific CAx domain) with the oldest timeframes. Such merging may prevent unintended biasing of older ML models (and, perhaps in effect, biasing towards more recent tracked command usage of the CAx application), and may be accomplished by merging of context trees or Markov chains used by trained ML models.

In any of the ways described herein, various CAx adaptive UI features may be implemented. While different CAx adaptive UI features are described in separately FIGS. 2-5, any of the various described CAx adaptive UI features may be implemented in combination. As such, the CAx tracking engine 106, CAx training engine 108, and CAx adaptive UI engine 110 may implement any combination of the features described herein, including on CAx UI adaptations on a per-user basis, per-CAx domain basis, based on tracked command usage of the CAx application, based on CAx application files of one or more CAx applications, and various combinations thereof.

Figure 6:
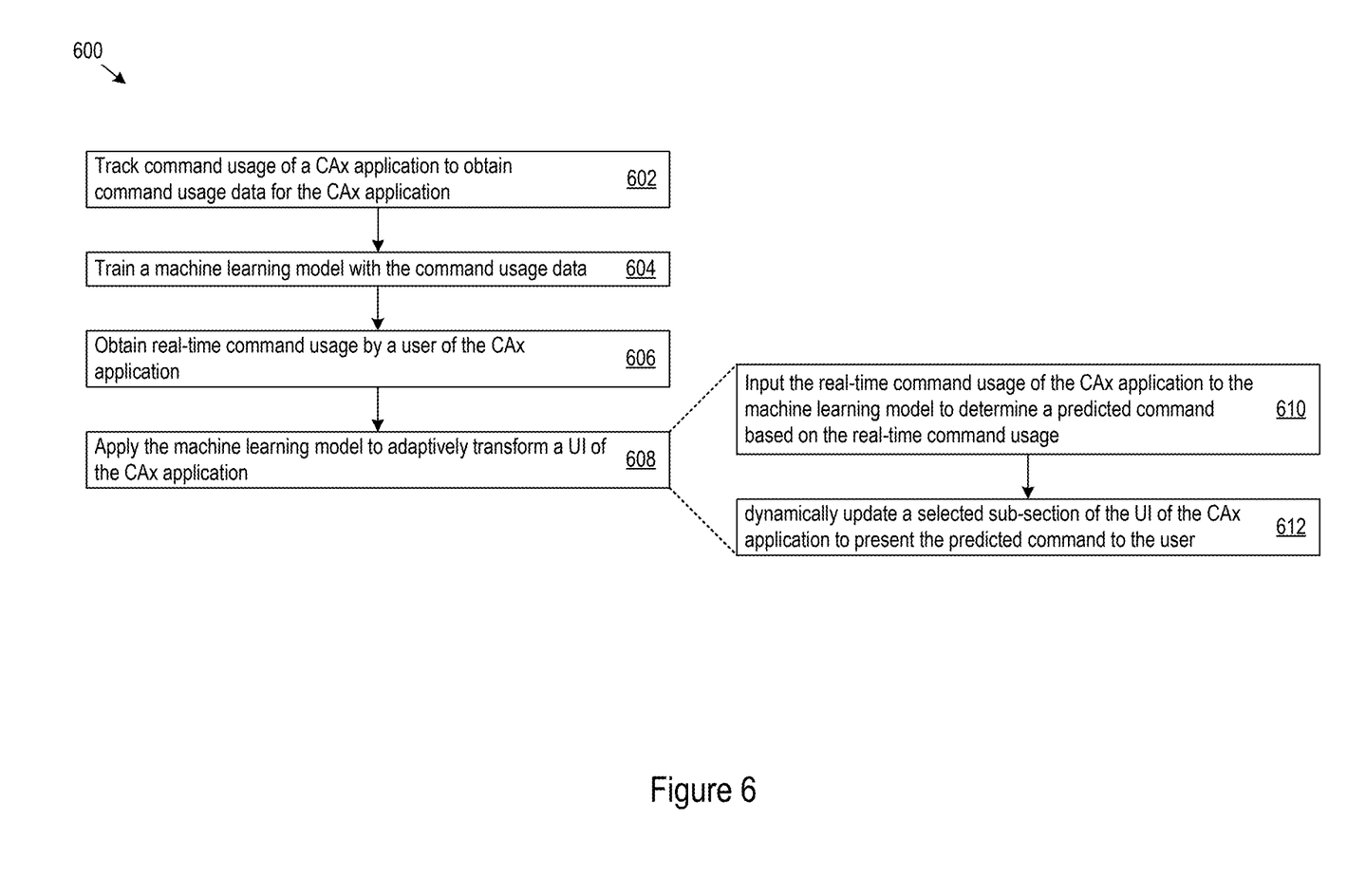
FIG. 6 shows an example of logic that a system may implement to support adaptive UIs for CAx applications.

FIG. 6 shows an example of logic 600 that a system may implement to support adaptive UIs for CAx applications. For example, the computing system 100 may implement the logic 600 as hardware, executable instructions stored on a machine-readable medium, or as a combination of both. The computing system 100 may implement the logic 600 via the CAx tracking engine 106, the CAx training engine 108, and the CAx adaptive UI engine 110, through which the computing system 100 may perform or execute the logic 600 as a method to provide adaptive UIs for CAx applications. The following description of the logic 600 is provided using the CAx tracking engine 106, CAx training engine 108, and CAx adaptive UI engine 110 as examples. However, various other implementation options by the computing system 100 are possible.

In implementing the logic 600, the CAx tracking engine 106 may track command usage of a CAx application to obtain command usage data for the CAx application (602) and the CAx training engine 108 may train a machine learning model with the command usage data (604). In implementing the logic 600, the CAx adaptive UI engine 110 may obtain real-time command usage by a user of the CAx application (606) and apply the machine learning model to adaptively transform a UI of the CAx application (608). The adaptive transformation step by the CAx adaptive UI engine 110 may include inputting the real-time command usage of the CAx application to the machine learning model to determine a predicted command based on the real-time command usage (610) and dynamically updating a selected sub-section of the UI of the CAx application to present the predicted command to the user (612).

The logic 600 shown in FIG. 6 provides but one example by which a computing system 100 may support adaptive UIs for CAx applications. Additional or alternative steps in the logic 600 are contemplated herein, including according to any features described for the CAx tracking engine 106, the CAx training engine 108, the CAx adaptive UI engine 110, or any combinations thereof.

Figure 7:
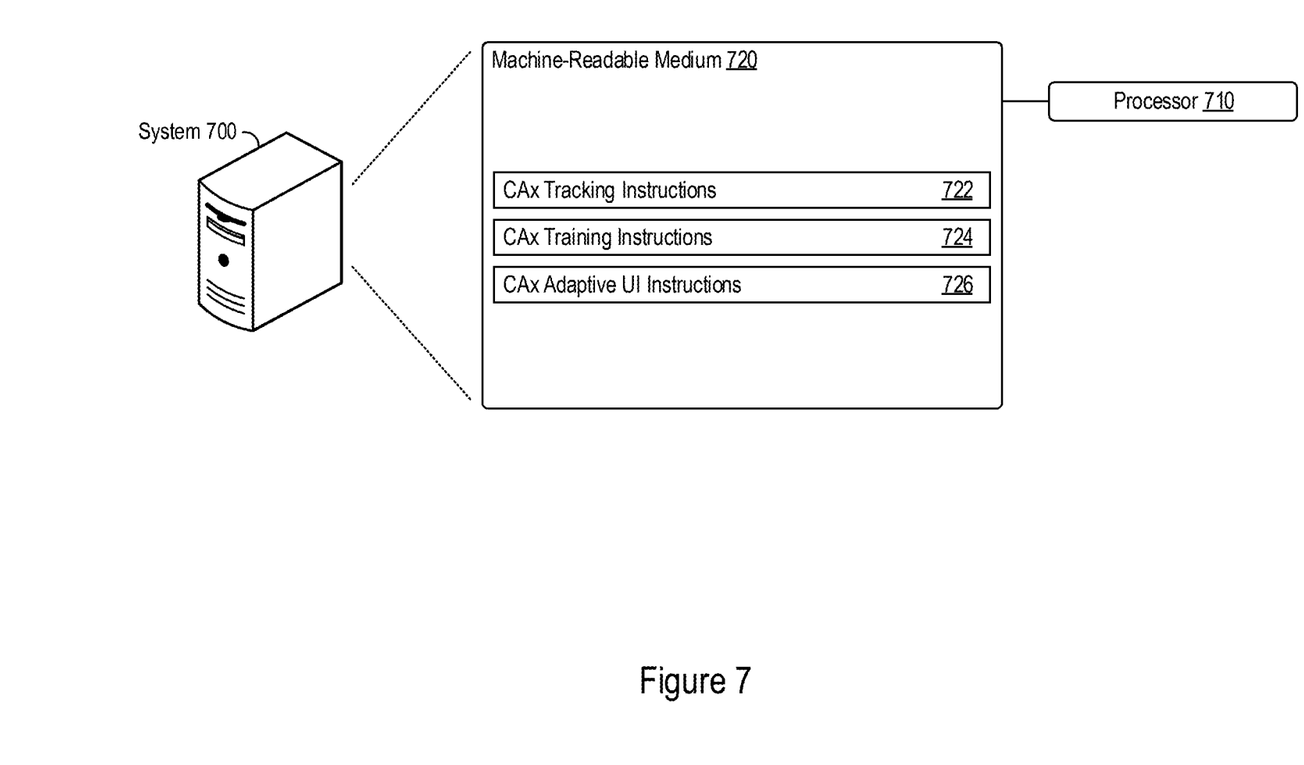
FIG. 7 shows an example of a system that supports adaptive UIs for CAx applications.

FIG. 7 shows an example of a system 700 that supports adaptive UIs for CAx applications. The system 700 may include a processor 710, which may take the form of a single or multiple processors. The processor(s) 710 may include a central processing unit (CPU), microprocessor, or any hardware device suitable for executing instructions stored on a machine-readable medium. The system 700 may include a machine-readable medium 720. The machine-readable medium 720 may take the form of any non-transitory electronic, magnetic, optical, or other physical storage device that stores executable instructions, such as the CAx tracking instructions 722, the CAx training instructions 724, and the CAx adaptive UI instructions 726 shown in FIG. 7. As such, the machine-readable medium 720 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 700 may execute instructions stored on the machine-readable medium 720 through the processor 710. Executing the instructions may cause the system 700 (or any other computing or CAx system) to perform any of the CAx adaptive UI features described herein, including according to any of the features with respect to the CAx tracking engine 106, CAx training engine 108, CAx adaptive UI engine 110, or combinations thereof.

For example, execution of the CAx tracking instructions 722 by the processor 710 may cause the system 700 to track command usage of a CAx application to obtain command usage data for the CAx application. Execution of the CAx training instructions 724 by the processor 710 may cause the system 700 to train a machine learning model with the command usage data. Execution of the CAx adaptive UI instructions 726 by the processor 710 may cause the system 700 to obtain real-time command usage by a user of the CAx application and apply the machine learning model to adaptively transform a user interface (UI) of the CAx application, including by inputting the real-time command usage of the CAx application to the machine learning model to determine a predicted command based on the real-time command usage and dynamically updating a selected sub-section of the UI of the CAx application to present the predicted command to the user.

The systems, methods, devices, and logic described above, including the CAx tracking engine 106, CAx training engine 108, and CAx adaptive UI engine 110, may be implemented in many different ways in many different combinations of hardware, logic, circuitry, and executable instructions stored on a machine-readable medium. For example, the CAx tracking engine 106, CAx training engine 108, CAx adaptive UI engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the CAx tracking engine 106, CAx training engine 108, CAx adaptive UI engine 110, or combinations thereof.

The processing capability of the systems, devices, and engines described herein, including the CAx tracking engine 106, CAx training engine 108, and CAx adaptive UI engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
tracking command usage of a computer-aided technology (CAx) application to obtain command usage data for the CAx application, including by tracking the command usage on a CAx domain-specific basis, wherein CAx domains for the CAx application are differentiated according to different part templates, part manufacturing processes, or industrial application; training machine learning models with the command usage data, including by training different machine learning models for different CAx domains of the CAx application;
obtaining real-time command usage by a user of the CAx application; and
applying the machine learning models to adaptively transform a user interface (UI) of the CAx application, including by:
identifying a particular CAx domain applicable to the real-time command usage;
inputting the real-time command usage of the CAx application to a specific machine learning model, among the machine learning models, trained for the particular CAx domain to determine a predicted command based on the real-time command usage; and dynamically updating a selected subsection of the UI of the CAx application to present the predicted command to the user.

2. The method of claim 1, wherein tracking further comprises tracking command usage on a CAx domain-specific basis for multiple different users of the CAx application.

3. The method of claim 1, wherein tracking the command usage on a CAx domain-specific basis comprises classifying a particular CAx domain applicable to tracked command usage based on a determined file template applicable to the tracked command usage, identified product metadata specified with respect to the command usage, analyzed product shape characteristics with respect to the command usage, or any combination thereof.

4. The method of claim 1, wherein tracking the command usage of the CAx application comprises:
   accessing a CAx application file of a completed product;
   extracting history data specific to the completed product from the CAx application file, the history data including a command history for generation of the completed product; and
   obtaining the command usage data for the completed product from the extracted history data.

5. The method of claim 1, further comprising:
   obtaining an application file of a source CAx application that is different from the CAx application;
   extracting history data from the application file of the source CAx application, the history data including a source CAx command history for generation of a product included in the application file of the source CAx application;
   translating a source CAx command sequence in the history data extracted from the application file of the source CAx application into a translated command usage data for the CAx application; and
   training the machine learning model further using the translated command usage data.

6. The method of claim 1, wherein the predicted command comprises an updated command of the CAx application to replace an outdated command identified in the real-time command usage by the user.

7. A system comprising:
   a processor; and
   a non-transitory machine readable medium comprising instructions, that when executed by the processor, cause a computing system to:
      track command usage of a computer-aided technology (CAx) application to obtain command usage data for the CAx application, including by tracking the command usage on a CAx domain-specific basis, wherein CAx domains for the CAx application are differentiated according to different part templates, part manufacturing processes, or industrial application;
      machine learning model machine learning models with the command usage data, including by training different machine learning models for different CAx domains of the CAx application;
      obtain real-time command usage by a user of the CAx application; and
      apply the machine learning models to adaptively transform a UI of the CAx application, including by:
         identifying a particular CAx domain applicable to the real-time command usage;
         inputting the real-time command usage of the CAx application to a specific machine learning model, among the machine learning models, trained for the particular CAx domain to determine a predicted command based on the real-time command usage; and dynamically updating a selected subsection of the UI of the CAx application to present the predicted command to the user.

8. The system of claim 7, wherein the instructions, when executed, further cause the computing system to track command usage on a CAx domain-specific basis for multiple different users of the CAx application.

9. The system of claim 7, wherein the instructions, when executed, cause the computing system to track the command usage on a CAx domain-specific basis by:
   classifying a particular CAx domain applicable to tracked command usage based on a determined file template applicable to the tracked command usage, identified product metadata specified with respect to the command usage, analyzed product shape characteristics with respect to the command usage, or any combination thereof.

10. The system of claim 7, wherein the instructions, when executed, cause the computing system to track the command usage of the CAx application by:
    accessing a CAx application file of a completed product;
    extracting history data specific to the completed product from the CAx application file, the history data including a command history for generation of the completed product; and
    obtaining the command usage data for the completed product from the extracted history data.

11. The system of claim 7, wherein the instructions, when executed, further cause the computing system to:
    obtain an application file of a source CAx application that is different from the CAx application;
    extract history data from the application file of the source CAx application, the history data including a source CAx command history for generation of a product included in the application file of the source CAx application; and
    translate a source CAx command sequence in the history data extracted from the application file of the source CAx application into a translated command usage data for the CAx application; and
   wherein the instructions cause the computing system to train the machine learning model further using the translated command usage data.

12. The system of claim 7, wherein the predicted command comprises an updated command of the CAx application to replace an outdated command identified in the real-time command usage by the user.

13. A non-transitory machine-readable medium comprising instructions that, when executed by a processor, cause a computing system to:
    track command usage of a computer-aided technology (CAx) application to obtain command usage data for the CAx application, including by tracking the command usage on a CAx domain-specific basis, wherein CAx domains for the CAx application are differentiated according to different part templates, part manufacturing processes, or industrial application;
    train machine learning models with the command usage data, including by training different machine learning models for different CAx domains of the CAx application;

obtain real-time command usage by a user of the CAx application; and apply the machine learning models to adaptively transform a user interface (UI) of the CAx application, including by:
identifying a particular CAx domain applicable to the real-time command usage;
inputting the real-time command usage of the CAx application to a specific machine learning model, among the machine learning models, trained for the particular CAx domain to determine a predicted command based on the real-time command usage; and dynamically updating a selected sub-section of the UI of the CAx application to present the predicted command to the user.

14. The non-transitory machine-readable medium of claim 13, wherein the instructions further cause the computing system to track command usage on a CAx domain-specific basis for multiple different users of the CAx application.

15. The non-transitory machine-readable medium of claim 13, wherein the instructions cause the computing system to track the command usage on a CAx domain-specific basis by classifying a particular CAx domain applicable to tracked command usage based on a determined file template applicable to the tracked command usage, identified product metadata specified with respect to the command usage, analyzed product shape characteristics with respect to the command usage, or any combination thereof.

16. The non-transitory machine-readable medium of claim 13, wherein the instructions cause the computing system to track the command usage of the CAx application by:
accessing a CAx application file of a completed product;
extracting history data specific to the completed product from the CAx application file, the history data including a command history for generation of the completed product; and
obtaining the command usage data for the completed product from the extracted history data.

17. The non-transitory machine-readable medium of claim 13, wherein the instructions further cause the computing system to:
obtain an application file of a source CAx application that is different from the CAx application;
extract history data from the application file of the source CAx application, the history data including a source CAx command history for generation of a product included in the application file of the source CAx application;
translate a source CAx command sequence in the history data extracted from the application file of the source CAx application into a translated command usage data for the CAx application; and
train the machine learning model further using the translated command usage data.

* * * * *